US011720552B2

(12) United States Patent
Kasimov et al.

(10) Patent No.: US 11,720,552 B2
(45) Date of Patent: *Aug. 8, 2023

(54) DOMAIN NAME REGISTRY DATABASE

(71) Applicant: UKCI Holdings Limited, Douglas (IM)

(72) Inventors: Ulvi Kasimov, London (GB);
Suleyman Kasimov, London (GB)

(73) Assignee: UKCI Holdings Limited, Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,899

(22) Filed: Jul. 18, 2022

(65) Prior Publication Data

US 2023/0008228 A1 Jan. 12, 2023

Related U.S. Application Data

(63) Continuation of application No. 17/017,297, filed on Sep. 10, 2020, now Pat. No. 11,392,579, which is a
(Continued)

(51) Int. Cl.
*G06F 15/16* (2006.01)
*G06F 16/23* (2019.01)
(Continued)

(52) U.S. Cl.
CPC ........ *G06F 16/2379* (2019.01); *G06F 16/958* (2019.01); *H04L 61/4511* (2022.05); *H04L 9/50* (2022.05)

(58) Field of Classification Search
CPC .............................. G06F 16/2379; H04L 9/50
See application file for complete search history.

(56) References Cited

U.S. PATENT DOCUMENTS 6,338,082 B1   1/2002   Schneider
6,880,007 B1   4/2005   Gardos
(Continued)

OTHER PUBLICATIONS

.ART Domain is a Time Capsule for Today's Creatives, https://blog.101domain.com/domains/art-domain-time-capsule-creatives. (Year: 1999).
(Continued)

*Primary Examiner* — Ario Etienne
*Assistant Examiner* — Thorne E Waugh
(74) *Attorney, Agent, or Firm* — Nixon Peabody LLP

(57) ABSTRACT

A method for providing and managing a top-level domain includes: (a) receiving a first domain name associated with a first object; (b) generating a "Whois" record associated with the received first domain name, the "Whois" record including a plurality of fields associated with the first domain name, the plurality of fields consisting of registration data required for creating the first domain name; (c) expanding the "Whois" record by adding one or more new fields associated with the first object to the "Whois" record, thereby linking the first domain name with the first object, wherein the one or more new fields comprises provenance information and metadata regarding the first object associated with the first domain name; and (d) creating a duplicate record of the "Whois" record in a blockchain system that is linked to the "Whois" record, wherein any changes in the "Whois" record is synced to the duplicate record.

20 Claims, 5 Drawing Sheets

Related U.S. Application Data continuation-in-part of application No. 15/630,258, filed on Jun. 22, 2017, now Pat. No. 10,805,263.

(60) Provisional application No. 62/353,272, filed on Jun. 22, 2016.

(51) Int. Cl.
*G06F 16/958* (2019.01)
*H04L 61/4511* (2022.01)
*H04L 9/00* (2022.01)

(56) References Cited

U.S. PATENT DOCUMENTS

| | | | |
|---|---|---|---|
| 6,895,430 B1 | 5/2005 | Schneider | |
| 7,042,335 B2 * | 5/2006 | Franks | G06Q 20/382 |
| | | | 340/5.82 |
| 7,188,138 B1 | 3/2007 | Schneider | |
| 7,194,552 B1 | 3/2007 | Schneider | |
| 7,493,403 B2 | 2/2009 | Shull | |
| 7,548,968 B1 * | 6/2009 | Bura | G06F 21/604 |
| | | | 709/206 |
| 7,761,583 B2 | 7/2010 | Shull | |
| 7,797,413 B2 | 9/2010 | Adelman | |
| 8,090,693 B2 | 1/2012 | Monroe | |
| 8,219,709 B2 | 7/2012 | Hughes | |
| 8,769,671 B2 * | 7/2014 | Shraim | G06Q 10/107 |
| | | | 726/22 |
| 9,141,717 B2 | 9/2015 | Schneider | |
| 9,558,497 B2 * | 1/2017 | Carvalho | G06Q 30/0185 |
| 9,659,070 B2 | 5/2017 | Schneider | |
| 9,747,378 B1 | 8/2017 | Mohan | |
| 9,953,105 B1 * | 4/2018 | Gupta | H04L 61/30 |
| 10,009,288 B2 * | 6/2018 | Blinn | H04L 61/4511 |
| 10,511,573 B2 * | 12/2019 | Larson | H04L 63/0876 |
| 11,392,579 B2 * | 7/2022 | Kasimov | G06F 16/958 |
| 2004/0044791 A1 | 3/2004 | Pouzzner | |
| 2004/0103205 A1 * | 5/2004 | Larson | H04L 63/0428 |
| | | | 709/229 |
| 2005/0114666 A1 * | 5/2005 | Sudia | G06F 21/645 |
| | | | 713/175 |
| 2006/0069697 A1 | 3/2006 | Shraim | |
| 2006/0168116 A1 * | 7/2006 | Adelman | H04L 67/02 |
| | | | 709/218 |
| 2006/0218303 A1 | 9/2006 | Adelman | |
| 2007/0028301 A1 * | 2/2007 | Shull | H04L 63/1483 |
| | | | 726/22 |
| 2008/0034211 A1 | 2/2008 | Shull | |
| 2009/0119402 A1 | 5/2009 | Shull | |
| 2009/0254545 A1 | 10/2009 | Fisken | |
| 2010/0042622 A1 | 2/2010 | Matkowsky | |
| 2010/0106650 A1 | 4/2010 | Adelman | |
| 2012/0084320 A1 | 4/2012 | Monroe | |
| 2013/0085932 A1 | 4/2013 | Waldron | |
| 2013/0173497 A1 | 7/2013 | Gould | |
| 2014/0006642 A1 | 1/2014 | Kothapalli | |
| 2015/0212710 A1 * | 7/2015 | Gupta | G06Q 30/0641 |
| | | | 715/765 |
| 2015/0302053 A1 | 10/2015 | Mitnick | |
| 2016/0055490 A1 | 2/2016 | Keren | |
| 2016/0098153 A1 * | 4/2016 | Gupta | H04L 61/3025 |
| | | | 715/765 |
| 2016/0179769 A1 | 6/2016 | Gershom | |
| 2017/0195286 A1 | 7/2017 | Stahura | |
| 2017/0279762 A1 | 9/2017 | Fregly | |
| 2021/0105304 A1 | 4/2021 | Kraning | |

OTHER PUBLICATIONS

WHATIS and Digital Twin, https://art.art/blog/whatis-art-records/. (Year: 2019).

* cited by examiner

DOMAIN NAME REGISTRY DATABASE

CROSS-REFERENCE TO RELATED APPLICATIONS

This application is a continuation of U.S. patent application Ser. No. 17/017,297, filed Sep. 10, 2020 and entitled "DOMAIN NAME REGISTRY DATABASE," which is a continuation-in-part of U.S. patent application Ser. No. 15/630,258, filed Jun. 22, 2017, which issued as U.S. Pat. No. 10,805,263 on Oct. 13, 2020, and which claims priority to and the benefit of U.S. Provisional Application No. 62/353,272, filed Jun. 22, 2016, each of which is hereby incorporated by reference herein in its entirety.

TECHNICAL FIELD

The present disclosure relates generally to information registering, searching, retrieval, and modification in database systems, and more specifically, relates to a method for operating a generic Top-Level Domain that uniquely identifies an object or a role.

BACKGROUND

The Domain Name System originated with the implementation of Advanced Research Projects Agency Network (ARPANET). The Domain Name System enabled individual computers to be identified uniquely for the purpose of transmitting and receiving data over a wide area network. The Domain Name System contains information that allows each computer to be uniquely identified. Each computer on the network is assigned an address, which is known as an Internet Protocol Address (IP Address). Each computer's IP Address consists of a unique string of digits. A domain name consists of a unique string of characters. The Domain Name System maps each unique domain name to its unique IP Address. Domain names consist of two parts: an initial string of alphameric characters followed by a period (commonly known as "dot") and by a second string of alphameric characters. The second string of characters is known as a Top-Level Domain. The Domain Name System recognizes only Top-Level Domains that have been specified by international convention. Some of the most commonly used Top-Level Domains are "com," "net," and "org." The first string of characters followed by the dot and then followed by the Top-Level Domain is known as a Second-Level Domain (SLD).

Domains exist at various different levels within the Domain Name System hierarchy. For example, a generic Top-Level Domain (gTLD), such as .com or .net, is a domain at the highest level in the Domain Name System hierarchy. Another type of Top-Level Domain is a country-code Top-Level Domain (ccTLD) such as, for example, ".UK." A second-level domain (SLD) is a subdomain of a Top-Level Domain (including gTLD and ccTLD), which is directly below the Top-Level Domain in the Domain Name System hierarchy. For example, "com" is the Top-Level Domain and "example" is the SLD for the domain name "www.example.com." An "n-level" domain can indicate any level of domain, including top-level, second-level, etc.

In addition to the traditional Top-Level Domains (e.g., .COM and .NET), the domain name system and domain name registration system have also evolved to allow the use of new generic Top-Level Domains, which may be applied for from the regulatory body pertaining to registries and registrars, the Internet Corporation for Assigned Names and Numbers (ICANN). Some of these generic Top-Level Domains are often referred to as "vanity" or "brand" domains, such as .MICROSOFT or .COCACOLA. ICANN also allows for "community-based" TLDs, such as .BANK or .HOTEL, and "geographic" TLDs, such as .AFRICA. Other TLDs may be contemplated by ICANN.

The creation and administration of a new Top-Level Domain requires several changes to be made at a registry, at one or more registrars, and at a variety of other services, such as Whois. The Whois server typically stores and provides domain registration information, such as registration date, expiration date, status, and owner of the registered domain names. The Whois server provides a service that can be queried by users via, for example, a website on the Internet provided by a registrar or registry or via standard Telnet-like clients. With ICANN's new generic Top-Level Domain program for new generic Top-Level Domains, hundreds of new generic Top-Level Domains are expected to be created over the next few years. However, all new Top-Level Domains are restricted to the confines and parameters of the typical Whois Server.

SUMMARY

A method for providing and managing a Top-Level Domain for identifying an object, includes: (a) receiving a first domain name associated with a first object; (b) generating a "Whois" record associated with the received first domain name, the "Whois" record including a plurality of fields associated with the first domain name, the plurality of fields consisting of registration data required for creating the first domain name; (c) expanding the "Whois" record by adding one or more new fields associated with the first object to the "Whois" record, thereby linking the first domain name with the first object, wherein the one or more new fields comprises provenance information and metadata regarding the first object associated with the first domain name; and (d) creating a duplicate record of the "Whois" record in a blockchain system that is linked to the "Whois" record, wherein any changes in the "Whois" record is synced to the duplicate record.

A system for providing and managing a Top-Level Domain for identifying an object, includes a domain name service (DNS) registry. The DNS registry is configured to store information concerning a first domain name associated with a first object, the DNS registry having access to a "Whois" record associated with the first domain name. The "Whois" record includes a plurality of fields consisting of (i) registration data required for creating the first domain name and (ii) new fields associated with the first object that link the first domain name with the first object, the new fields comprising provenance information and metadata regarding the first object. The DNS registry is further configured to manage one or more domains in a blockchain system, wherein the first domain is included in the one or more domains, and wherein managing the one or more domains in the blockchain system includes creating a duplicate record of the "Whois" record in the blockchain system.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figures 1, 2:
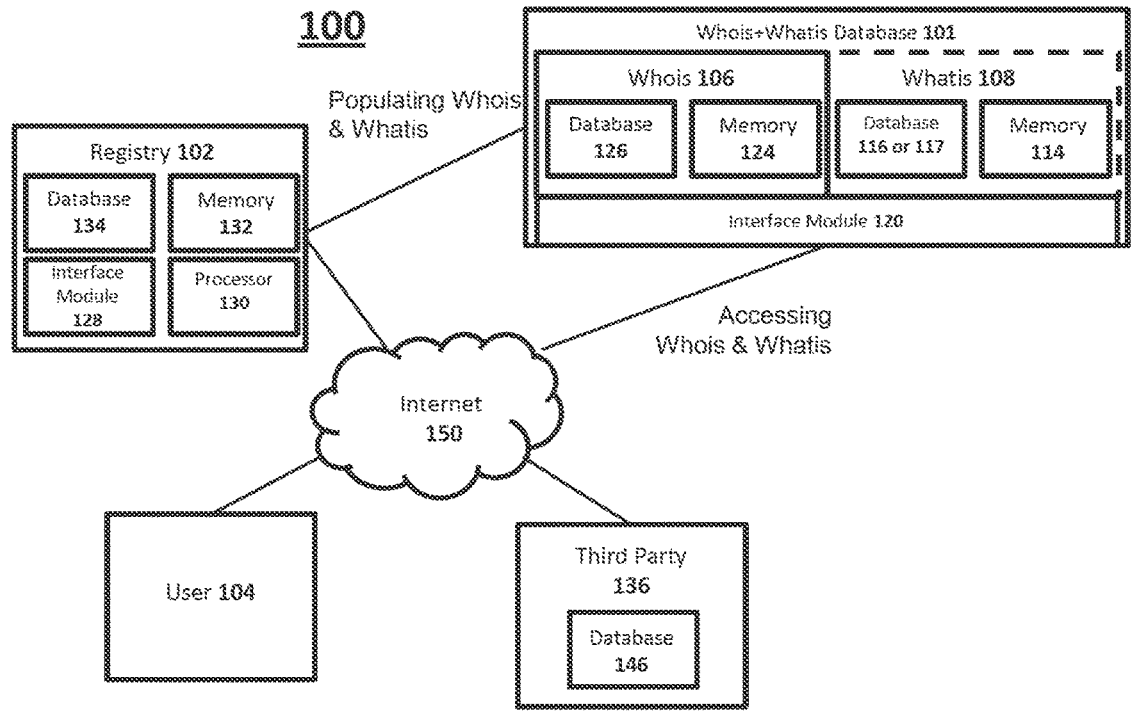
FIG. 1 is a schematic block diagram of an exemplary system for registering a generic Top-Level Domain that uniquely identifies an object or a role with a certain set of permissions.
FIG. 2 is a schematic block diagram for an exemplary Whois server for linking the domain name with an object in accordance with an illustrative embodiment of the present disclosure.

The present disclosure is susceptible of various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION

The present disclosure is directed to a system and method for providing and managing a Top-Level Domain that uniquely identifies an object or a role with a certain set of permissions. As used herein, the term ".ART" generally refers to an exemplary embodiment of a Top-Level Domain identifier. Furthermore, the Second-Level Domain represents the object or role. In other words, as the object transfers ownership, so will the domain name. The domain name is a unique identifier and, in the case of .ART for example, is identified with a unique piece of artwork or art-related role. The domain name provides a form of provenance, authentication and other valuable sources of information regarding an individual artwork or personal details that will increase the value and trustworthiness of the piece or the association with the role. Whois and zone file data can be used to trace and establish ownership and history. While artwork can be replicated; a domain name is always clearly unique.

In an embodiment, a method for providing and managing a Top-Level Domain that uniquely identifies an object or a role with a certain set of permissions is provided. The method may comprise linking the domain name with an object (e.g., an artwork) by adding approximately eight additional fields to the domain name "Whois" record. The "Whatis" (the number of additional fields that are added to the existing, required Whois data fields) directly links the domain name, the registrant, and an (art) object. In some embodiments, the "Whatis" record can be referred to as the "Art Record." Any or all of the additional fields can be employed in many varieties of ways as a link and an identification with objects or roles, transferring with the ownership of an object or, say, title or position of a role. In an exemplary embodiment, new Whois fields are introduced. These fields may include an object flag (yes or no), artist name, artwork title, creation date, medium, and artwork dimensions. Other fields may be included. In other embodiments, such as for example, vintage automobiles, persons of title, some or all of the fields can be employed as determined by the users of this new tool. The additional Whois fields are determined in order to establish artwork provenance. The new Whois fields will comprise "Art Records" or "Whatis".

FIG. 1 illustrates a diagram providing an example of a system 100 for serving a new top-level domain (TLD), consistent with the disclosed embodiments. In this example, a registry 102, a user 104, a Whois server 106, and a third-party 136 may be connected to a network, such as Internet 150. In certain embodiments, the network may be any type of communication network configured to transmit information between the devices of system 100. For example, the network may include a wireless and/or wireline network components (e.g., hardware, software, and/or firmware) configured to receive, route, translate, and deliver information. The network may also include an extranet, an Intranet, a Local Area Network, etc. and infrastructure that communicates information over these types of networks, such as wireless/wireline base stations, transceivers, and related technology.

Registry 102 may be an entity that manages a new TLD. Registry 102 may include infrastructure to define and provision new TLDs, including, for example, computer components (e.g., servers, processors, memory devices storing software instructions that when executed by processor(s) execute provisioning-related processes, communication components, and the like). Registry 102 may include one or more processors 130 and memory devices (memory) 132 storing software instructions that, when executed by processors 130, perform one or more operations consistent with the disclosed embodiments. Registry 102 may include an interface module 128, such as a graphical user interface, to allow registry 102 to manage TLDs. Registry 102 may also include Database 134 used to store the managed TLDs.

Whois server 106 may provide a service accessible by registry 102 for responding to Whois queries. Whois server 106 may be one or more computers configured to receive requests for information over a network (e.g., Internet 150) and provide information to components over the network. For example, in one embodiment, Whois server 106 may include one or more computer or data processing devices that have hardware (e.g., processors, storage memory, data buses, network interface, etc.) and/or software (e.g., application programs, operating systems, other executable program code written in any known programming languages). Whois server 106 may include one or more processors 122 and memory devices (memory) 124 storing software instructions that, when executed by processors 122, perform one or more operations consistent with the disclosed embodiments. Whois server 106 may include an interface module 120, such as a web interface, to allow registry 102, user 104, or third party 136 to query for information relating to the TLDs that Whois server 106 serves. Whois server 106 may also include one or more databases 126 for storing information relating to TLDs.

In one embodiment, Whois server 106 may be associated with registry 102. For example, Whois server 106 may be associated with a Whois service provider that provides the service for registry 102. In another embodiment, Whois service 106 may be part of registry 102. In other embodiments, Whois server 106 may provide Whois services for multiple entities that manage TLDs, including registry 102 and third party 136. For example, third party 136 may be a corporation, partnership, company, or other business entity that manages a new gTLD, such as .MICROSOFT.

User 104 may be an individual accessing Whois server 106 via, for example, a website on the Internet 150 or via Whois server 106's interface 120. Alternatively, user 104 may be a registrar or other corporation, partnership, company, government agency, municipality, or other forms of business or government entities that accesses Whois server 106. System 100, or one or more components of system 100, may be configured to execute processes that provide Whois services relating to TLDs defined and provisioned by registry 102.

FIG. 2 illustrates a diagram for an exemplary Whois server database 126 for linking the domain name with an object (e.g., an artwork) by adding additional fields to the domain name "Whois" record, consistent with the disclosed embodiments. Each field may be associated with a TLD, where the TLD .ART is a preferred embodiment provisioned by registry 102. In an exemplary embodiment, the new Whois fields will comprise Whatis Database 127. These fields may include object flag (yes or no), artist name, artwork title, creation date, medium, and artwork dimensions. Other fields may be included. In other embodiments, such as for example, vintage automobiles, persons of title, some or all of the fields can be employed as determined by the users of this new tool. The field content and format may be based on standards promulgated by pertinent industry-standards bodies. The additional Whois fields are determined in order to establish artwork provenance. Additional fields, may be included. Examples of the data fields may include the Artist name in the following format: First (underscore)Middle(underscore) LAST). Further, data fields may include the artwork medium represented by, for example, a pull down menu that includes the choice of "other" plus a free field. The data fields may also include the date the artwork was created, represented by pull down menus with date, month and year. Furthermore, the date the artwork was created may be represented by a "circa" option or an equivalent. The data fields may also include the artwork dimensions. The artwork dimensions may be represented, for example, in the following format: NNN×NNN in cm for paintings; NNN×NNN×NNN in cm for three-dimensional work (Horiz×Vert×Depth). Because the Whois database 126 contains object specific identifiers, the domain name is a transferrable asset, whereas the website URL is not. The domain name may be licensed or sold. For example, third party applications using object identifier.art data may view and/or transfer the objects via mobile application, gallery software, auction software, virtual reality software embedded on mobile devices, tablets, desktops, laptops and display devices at user 104.

Figure 3:
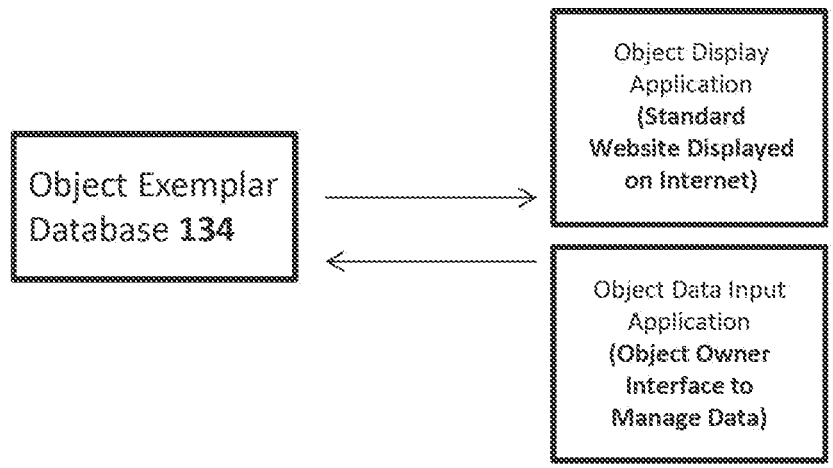
FIG. 3 is a schematic block diagram of an exemplary registry database for providing and managing a domain name based on the data fields provided with respect to the Whois server in accordance with an illustrative embodiment of the present disclosure.
Figure 3:
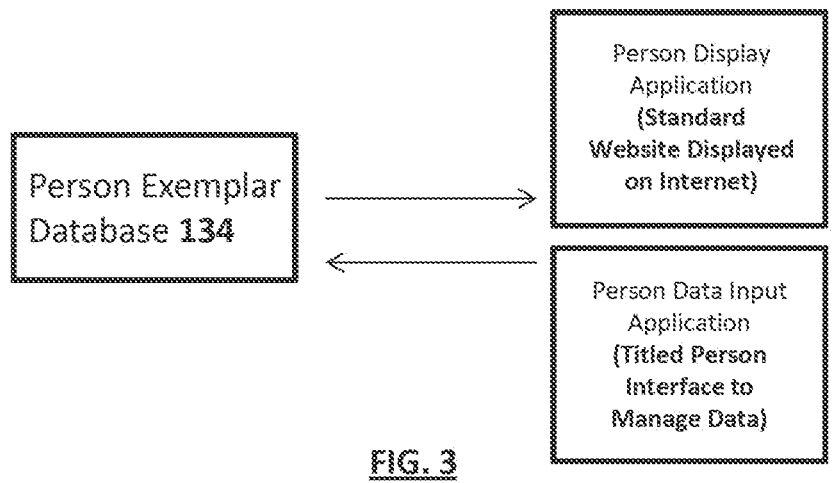

FIG. 3 is a schematic block diagram of a registry database 134 for providing and managing a domain name based on the data fields provided with respect to the Whois server 106. Registry database 134 can provide access through a secure connection to the user 104, where the user can view the object on a standard website displayed on the internet. Furthermore, the registry database 134 can receive electronic frame data input from the object owner at the registry interface module 128. Through the registry interface module 128 the owner can manage data associated with the domain name through a secure connection. In an exemplary embodiment, the domain name will start with the acronym "obj" or "http://obj-", where "obj" indicates an "Art Record". Alternatively, the Art Record database might be comprised of as third-level names, for example: http://obj-.artrecords.art. The domain name may be based on a combination of numerical expressions (e.g., algorithm) of the new Whois data points that are entered; for example: the artist's name, the artwork title, the date the artwork was created, the artwork medium and the dimensions of the artwork. A domain name of the artwork owner's choosing can also identify and be linked with the work of art. For example, authoritative oversight organizations, as well as commercial organizations have developed standard formats for certified artwork registered in their repository. If artsy.com or other registration repositories wish to join the .ART scheme, they might be reticent to give up their identifying naming convention. Even without an existing nomenclature, the artwork owner might desire an intuitive name for her/his artwork. After all, .ART provides more intuitive, memorable names.

Both types of names should be used. Each piece of artwork may employ a "obj-.ART" name as the primary, unique identifier. In addition, the artwork may also be linked to and identified with a more intuitive domain name. The owner can purchase the obj-.ART name and, as an option, also purchase a second .ART name of her/his choosing. Or the owner might continue to designate an Artsy or other identifier to which the owner has the rights. In this later case, the owner may provide .ART with the second domain name and the obj-.ART or the obj-.artrecord.art name will redirect to it.

The database 134 may also include public, private or proxy registration for the domain name. In a present embodiment, domain name registrants are obligated to include their name and contact information into the Whois database. Some artwork owners may prefer for that information to be public. For example, museums might choose to can publicly identify themselves through Whois. Other artwork owners prefer privacy, not revealing their home address or name. Therefore, the Art Record repository can offer three types of registration: public, private and proxy. In a public registration, all Whois/Whatis information is public. In the private registration, the registrant name is visible but the registrar, which furnishes the registrar's contact information, masks the address. In the proxy registration, an agent registrant masks all of the registrant's information. This includes the registrar and its name and contact information. In this case, .ART can specify its own agent proxy registrant.

Figure 4:
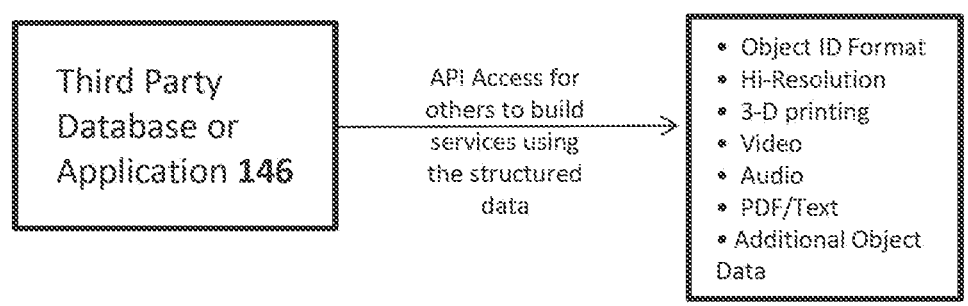
FIG. 4 is a schematic block diagram of an exemplary third-party database for providing API access for a third party to create services using the structured data in accordance with an illustrative embodiment of the present disclosure.

FIG. 4 is a schematic block diagram of a third party database 146 for providing application programming interface (API) access for a third party to create services using the structured data in the present disclosure. An API may comprise a service made available to third parties, which may further comprise any individual, entity, system, hardware, or software wishing to access the disclosed information and functionality. Such an API may comprise a software-to-software interface that specifies the protocol defining how independent computer programs interact or communicate with each other. It also may comprise a collection of pre-configured building blocks allowing a third party to easily configure their software for compatibility and/or extensibility. The API may allow a requesting party's software to communicate and interact with the software application and/or its provider—perhaps over a network—through a series of function calls (requests for services). It may comprise an interface provided by the software application and/or its provider to support function calls made of the software application by other computer programs. As shown in FIG. 4, the third party database 146 may allow access to the object data. In addition, the third party database 146 may allow third parties to write information as well to store for the Art Record. Once the third party obtains permission it will be able to store object-related information in the database.

Figure 5:
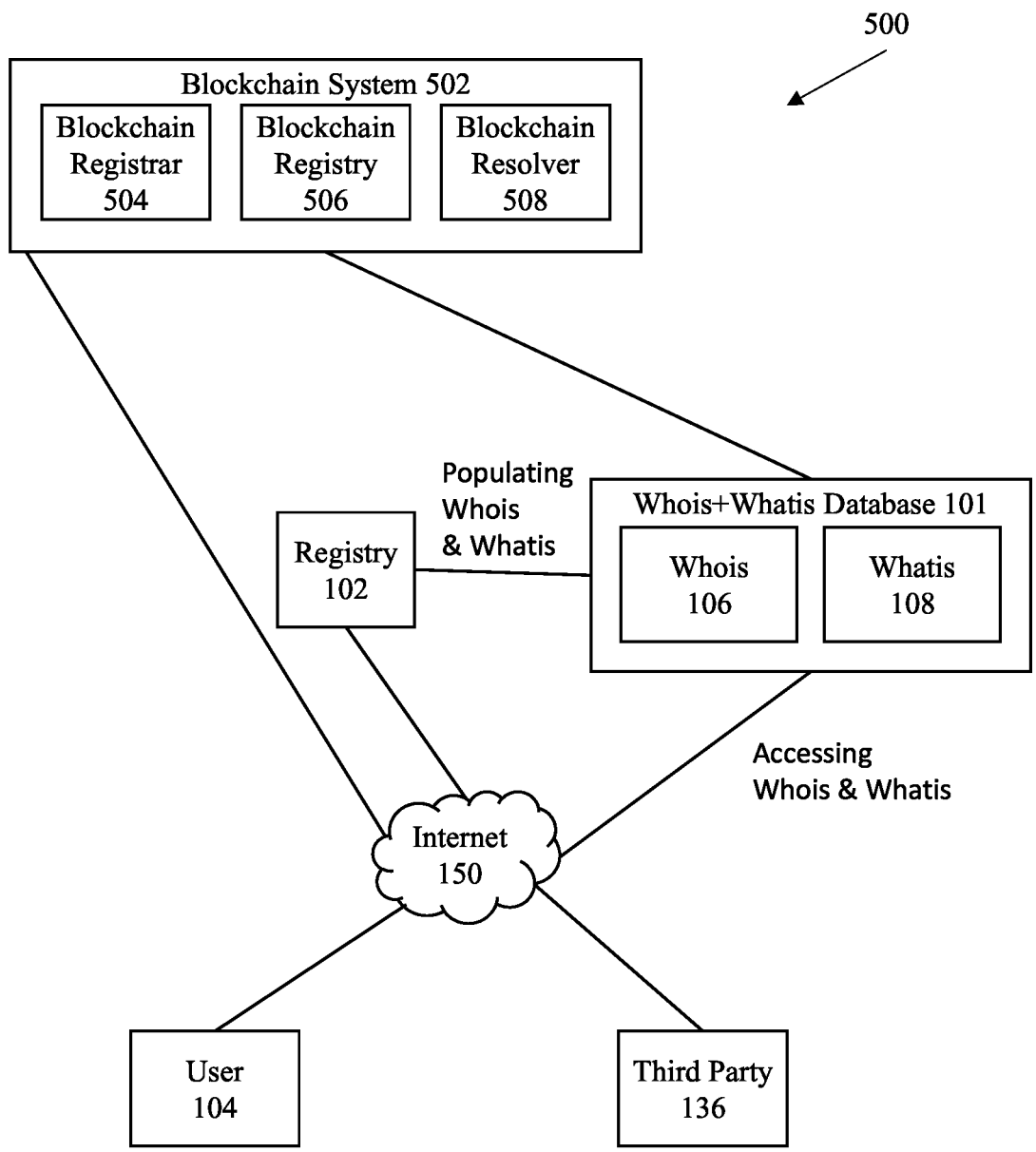
FIG. 5 is a schematic block diagram of an exemplary system for registering a generic Top-Level Domain that uniquely identifies an object or a role with a certain set of permissions, according to some implementations of the present disclosure.

FIG. 5 illustrates a system 500 for serving a new TLD, according to some implementations of the present disclosure. The system 500 is similar to the system 100 of FIG. 1. Similar to the system 100, the system 500 includes the registry 102, the Whois+Whatis database 101 (which includes the Whois server 106 and the Whatis server 108), the internet 150, the user 104, and/or the third party 136. These components are previously described in connection with FIG. 1. The system 500 further includes a blockchain system 502 for storing information related to the Whois and/or Whatis fields which were previously described in connection to FIGS. 1 and 2.

The blockchain system 502 includes one or more computing devices referred to as nodes. There are different types of nodes, e.g., a full node or a partial node. Each node includes at least one processor, at least one memory module, and at least one storage device. The blockchain system 502 functions as a distributed database such that each of the full nodes in the blockchain system 502 includes a full copy of information stored in the distributed database. As such, full nodes tend to emphasize storage requirements over processing requirements. On the other hand, some nodes in the blockchain system 502 can be processor intensive. These processor intensive nodes can be referred to as miners which are incentivized to perform transactions on the blockchain.

In some implementations, the blockchain is a public ledger (public database) that is organized as a linked list. Each of the items linked together to form the linked list is called a block. The nodes of the blockchain determine whether or not to add a new block to the linked list (i.e., the blockchain). Since the blockchain is a distributed database, a consensus algorithm is used by the nodes to determine whether the new block should be added to the blockchain. In some implementations, a majority of the nodes are required to reach consensus, and in some implementations, all nodes should unanimously approve the new block. The blockchain uses cryptography and digital signatures to ensure confidentiality and authentication on the distributed database system. The blockchain uses hashing to verify information within the blockchain has not been compromised.

The blockchain can provide transparency, immutability (i.e., changing data leaves a traceable footprint), and increased security since there is no single point of breach. Immutability is a desirable feature in some implementations because the blockchain can preserve ownership information. For example, if an object transfers owners, this information can be stored in the blockchain automatically. Any change to the owner of the object can be easily tracked by the blockchain, allowing one to verify previous ownership of an object. Immutability ensures that the history of ownership and/or chain of custody is preserved. This advantage ensures trust when transferring ownership of objects because a previous owner can always access immutable data concerning chain of ownership or custody on the blockchain. As such, it is desirable to store provenance information in a distributed database such as the blockchain system 502.

In some implementations, information stored in the Whatis server 108 is duplicated and stored in the blockchain system 502. That is, the Art Record stored in the Whatis server 108 can be duplicated and stored in the blockchain system 502. For example, the Whatis server 108 can store object information, such as "Artist Name", "Artwork Medium", and "Artwork Dimensions". This information can be stored in the blockchain and an address "1Y761KZXjcopfXpSMjH9g5MxDDTPi4zEWq" can indicate a location where the information is stored. Any changes made to the blockchain constitutes a transaction. For example, if the address "1Y761KZXjcopfXpSMjH9g5MxDDTPi4zEWq" refers to stored data of {"John Smith", "Oil", and "54×23"}, and the stored data is later changed to {"Jane Smith", "Oil", and "54×23"}, then this information change in the location indicated by the address "1Y761KZXjcopfXpSMjH9g5MxDDTPi4zEWq" will be recorded. Furthermore, in some implementations, the address "1Y761KZXjcopfXpSMjH9g5MxDDTPi4zEWq" has an associated owner who has been authenticated to make such a change to the blockchain, thus, address and owner can be linked. Since the blockchain is readable by anyone with access to the blockchain, the owner can be masked using hashing. Thus, transactions can be visible, but individual owners non-identifiable.

In addition to the consensus algorithm, the blockchain system 502 can include other software that underlie the rules of how the blockchain system 502 operates. In some implementations, the blockchain system 502 includes a virtual machine layer which can provide a virtual machine environment for programmers or developers to build distributed services and/or software on the blockchain. A blockchain naming service can be one of the services provided on the blockchain system 502. The blockchain naming service allows an address to be typecast in a human readable format, in a similar manner that the DNS allows typecasting IP addresses in human readable formats. For example, the address "1Y761KZXjcopfXpSMjH9g5MxDDTPi4zEWq" can be typecast as "boo.art". So instead of working with the address, a developer, programmer, or a user can merely refer to "boo.art".

To enable a blockchain naming service for storing Whatis information on the blockchain system 502, the blockchain system 502 includes multiple software engines that perform specific functions. The software engines run on virtual machines as previously discussed. The blockchain system 502 can include the following software engines: a blockchain registrar 504, a blockchain registry 506, and a blockchain resolver 508. The blockchain registrar 504 determines how domain level assignments are made in the blockchain system 502. For example, the blockchain registrar 504 provides rules for who gets to own "boo.art" in the blockchain system 502. If "boo.art" already exists in the blockchain system 502 and is owned by Owner 1, the blockchain registrar 504 includes rules for who gets to assign "boo.art" to another owner. In some implementations, the blockchain registrar 504 can allow Owner 1 to transfer "boo.art" to Person 2, or the blockchain registrar 504 can prohibit Owner 1 from making any transfers. In some implementations, the blockchain registrar 504 requires that Owner 1 has to request that a manager of the blockchain naming service relinquish Owner 1's ownership and assign "boo.art" to Person 2. In some implementations, the blockchain registrar 504 serves as the manager. That is, an authorized owner (e.g., Owner 1) can use the blockchain registrar 504 to assign "boo.art" to Person 2.

Note that the blockchain naming service is separate and distinct from the DNS already discussed in connection with FIGS. 1-4. That is, "boo.art" in DNS is separate from "boo.art" in the blockchain naming service. Since DNS is separate from the blockchain naming service, embodiments of the present disclosure provide systems and methods for reconciling similar names between DNS and the blockchain naming service.

The blockchain registry 506 maintains a mapping from domain name to an owner and the blockchain resolver 508. For example, gTLD ".ART" is connected to Owner A, "boo.art" can be connected to Owner 1, "hello.boo.art" connected to Owner 2, "scared.art" connected to Owner 3, "nightmare.boo.art" connected to Owner 4, "halloween.art" connected to Owner 5, "elm.street.freddy.art" connected to Owner 6, etc.

The blockchain resolver 508 can manage stored data and map names to addresses. For example, a gTLD in DNS is ".ART". The gTLD can include subdomains (e.g., "boo.art", "hello.boo.art", "scared.art", "nightmare.boo.art", "halloween.art", or "elm.street.freddy.art"). In the blockchain system 502, each of the subdomains under the gTLD can be stored as {value→address} maps, for example, {"boo.art"→"1Y761KZXjcopfXpSMjH9g5MxDDTPi4zEWq"}, or {"halloween.art"→"4NIO1KsaccopfXpSMjH9g5MxDDTPi4zEWq"}. Each of the subdomains under the gTLD can be stored as {name→{address, {key1→value 1}, {key2→value 2}, {key3→value 3}, . . . }. For example, {"boo.art"→{"1Y761KZXjcopfXpSMjH9g5MxDDTPi4zEWq", {"Artist"→"Jane Smith"}, {"Materials and techniques"→"Oil"}, {"Dimensions"→"54×23"}}.

The blockchain resolver 508 allows converting domain name requests to addresses. For example, a request for "boo.art" is sent to the blockchain resolver 508. The blockchain resolver 508 then uses "boo.art" to find the address "1Y761KZXjcopfXpSMjH9g5MxDDTPi4zEWq" indicating a storage location for information related to "boo.art" (e.g., Whatis information). The blockchain resolver 508 stores the information related to "boo.art".

In some implementations, the blockchain system 502 is the Ethereum blockchain running the Ethereum Virtual Machine. The name service in Ethereum can be the Ethereum Name Service (ENS). The blockchain registrar 504, the blockchain registry 506, and the blockchain resolver 508 can be smart contracts in the Ethereum blockchain. A smart contract is a computer program that automatically executes or documents relevant events. In the discussion below a gTLD ".ART" will be used as an example, but the use of ".ART" is not to be limited to this specific TLD. Embodiments of the present disclosure can be applied to any TLD.

In ENS, the blockchain registrar 504 is a smart contract responsible for allocating subdomains of ".ART" domain in ENS. In some implementations, the ".ART" DNS registry (the registry 102 and/or the Whois+Whatis database 101) is designated as the default owner for the gTLD ".ART" and any subdomains under ".ART" in ENS. Designating the ".ART" DNS registry as the owner reduces requirements for customers to know underlying blockchain technology or require customers to have and manage their underlying blockchain wallet. Designating the ".ART" DNS registry as the owner allows the ".ART" DNS registry to update any ".ART" records stored in ENS without the need for authenticating specific users.

This is different from standard ENS operations which forces delegation of the same DNS name and creation of special DNS records to authorize owners. For example, if "boo.art" and "scare.art" are two websites under DNS that are owned by two different users (User 1 and User 2, respectively), then these two users, when creating corresponding ENS domains, will have authentication directed at User 1 and User 2. There is an authentication overhead cost associated with multiple user-owners in conventional ENS implementation. This drawback is avoided in implementations of the present disclosure. Making the ".ART" DNS registry the owner simplifies authentication and simplifies activities performed by the blockchain registrar 504. That way, when changes in the Whatis (and/or Whois) fields are made in the Whois+Whatis database 101, those changes can be automatically synced in ENS by the ".ART" DNS registry (i.e., the registry 102 and/or the Whois+Whatis database 101), without needing to go through provisions of a per-user authentication.

In some implementations, a combination of the standard ENS operations and designating the ".ART" DNS registry as discussed is used. For example, User 1 owns "boo.art" in DNS, and User 2 owns "scare.art" in DNS. In ENS, the ".ART" DNS registry is set as owner of both "boo.art" and "scare.art". User 2 can request the blockchain registrar 504 change this ownership and choose User 2 as owner of "scare.art" in ENS. When this is the case, the ".ART" DNS registry can make an indication that "scare.art" information in ENS is untrusted since User 2, as owner of "scare.art" in ENS, is able to directly modify stored information related to "scare.art" in ENS.

In some implementations, the blockchain registry 506 is a smart contract that maintains a mapping from the domain name (at any level) to the owner and the blockchain resolver 508. For example, "boo.art" has ".ART" DNS registry as the owner of "boo.art" and specifies a resolver (e.g., the blockchain resolver 508). In another example, "scare.art" has ".ART" DNS registry as the owner of "scare.art" and specifies a resolver. For the ".ART" domain and any subdomains in ENS, the blockchain registrar 504 can designate ".ART" DNS registry as the owner.

In some implementations, in ENS, the blockchain resolver 508 is a smart contract that maps domain or subdomain name to an address or some other resource. The blockchain resolver 508 can also store a copy of the Art Record provided in the Whois+Whatis Database 101. In some embodiments, since ".ART" DNS registry is made owner of all ".ART" domains and subdomains in ENS, corresponding names of owners of domains and subdomains do not correspond with the parallel DNS system. As such, the copy of the Art Record stored in the blockchain resolver 508 includes the corresponding names of owners in the DNS system. For example, if "cola.art" in DNS is owned by "Jane Doe", then in ENS, "cola.art" is owned by the ".ART" DNS registry to avoid user level authentication. In order to preserve ownership information for "cola.art", the blockchain resolver 508 stores "Jane Doe" as registrant (i.e., the owner in the DNS system). The blockchain resolver 508 not just holds the copy of the Art Record (e.g., title, artist, or any other data relevant to the object) but can also include name and/or organization or other identifying information for the owner of the corresponding domain name in the DNS system.

The blockchain resolver 508 can be a key-value storage on the Ethereum blockchain and include at least two programming interfaces. The blockchain resolver 508 can include a programming interface for storing value (i.e., domain's data, e.g., the Art Record) for the key (i.e., the domain, e.g., "boo.art"). All stored data is publicly available for retrieval.

Figure 6:
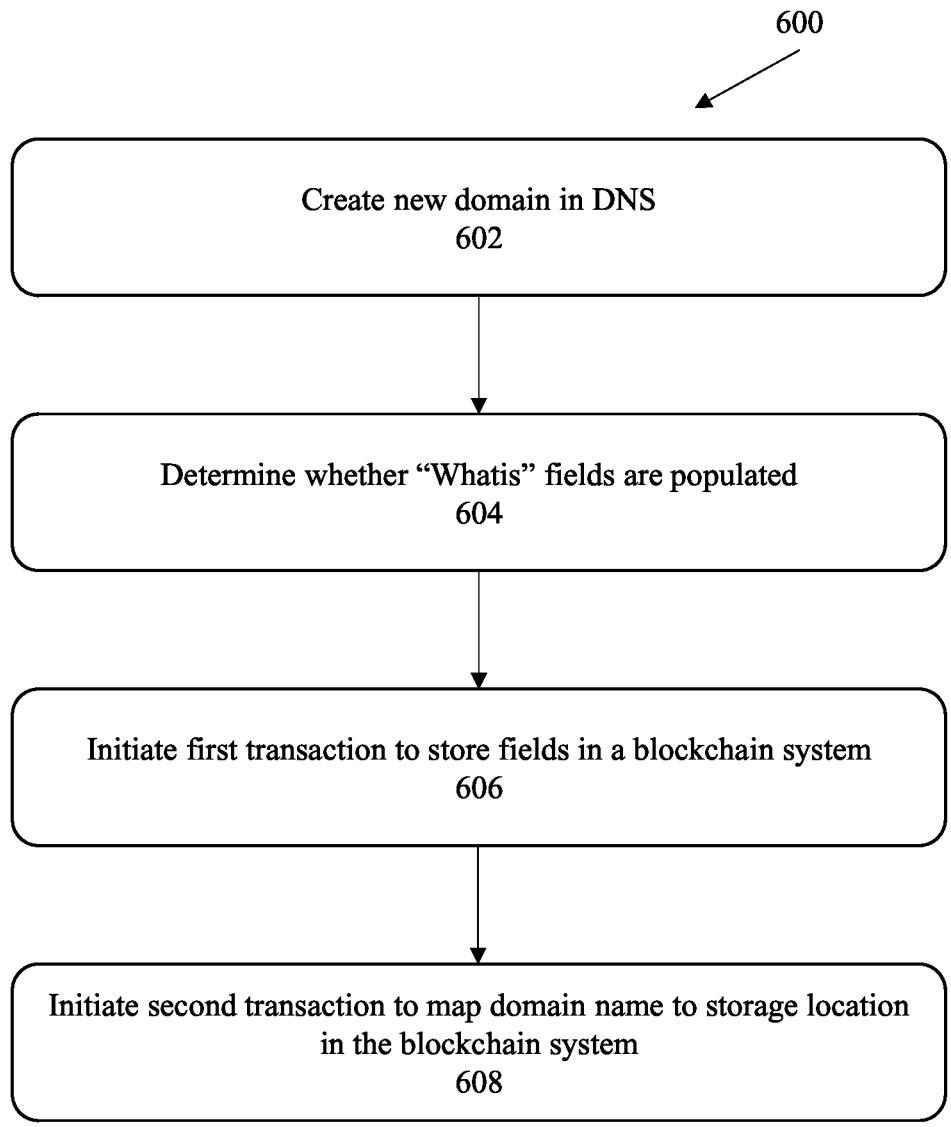
FIG. 6 is a process for populating a blockchain storage system, according to some implementations of the present disclosure.

FIG. 6 illustrates a process 600 for populating a blockchain storage system (e.g., the blockchain system 502) with domain level information. The blockchain system 502 can run a name service, e.g., ENS in some implementations. At step 602, the user 104 requests the registry 102 create a new domain as discussed above in connection with FIGS. 1-4. The user 104 can provide Whois data fields and Whatis data fields during registration. For example, the user 104 can seek to register "boo.art" and provide name "Jane Doe" from organization "Art Jane". The website created under the domain name "boo.art" can include an artwork by an artist "Jackie Smith", completed "Jun. 21, 1995", with original dimension "540×340" pixels. This information can be provided by the user 104 when registering "boo.art" with the registry 102 (i.e., the DNS registry). The information is stored in the Whois+Whatis database 101.

At step 604, the registry 102 and/or the Whois+Whatis database 101 determines whether "Whatis" fields are populated. That is, the registry 102 and/or the Whois+Whatis database 101 determines whether any extra information outside of standard Whois fields (e.g., information discussed in connection with FIG. 2) is populated.

At step 606, the registry 102 and/or the Whois+Whatis database 101 automatically initiates a first transaction to store information (or fields) in the blockchain system 502. For example, the registry 102 monitors the "Whatis" fields of the Whois+Whatis database 101 and any new field populated or any old field changed automatically causes the registry 102 to initiate the first transaction. In an example, the registry 102 performs a first transaction to store owner's name and/or organization and object's data in ENS resolver smart contract internally mapped to the domain name. For example, the blockchain resolver 508 stores {domain: "boo.art"; owner: "Jane Doe"; organization: "Art Jane"; artist: "Jackie Smith"; date: "Jun. 21, 1995"; dimensions: "540×340"}. Note that owner in the example refers to registrant or DNS owner of the DNS domain "boo.art". The registry 102, being able to initiate changes to the information stored in the blockchain resolver 508, is the owner in ENS.

At step 608, the registry 102 and/or the Whois+Whatis database 101 initiates a second transaction to map the domain name to the storage location in the blockchain system 502. For example, the domain name "boo.art" is allocated in ENS. The blockchain registrar 504 emits a transaction to store "boo.art" in the blockchain registry 506. The blockchain registrar 504 sets the ".ART" DNS registry (i.e., the registry 102 and/or the Whois+Whatis database 101) as the owner of "boo.art" and associates the ".ART" DNS registry with the blockchain resolver 508 that stores information about the "boo.art" domain in ENS. As such, the blockchain resolver 508 can resolve the domain name "boo.art" to connect to other information about "boo.art" stored in the blockchain system 502. Since the blockchain resolver 508 is publicly accessible, the information on "boo.art" is publicly available without user authentication. That is, the third party 136 can run a Whois query on "boo.art" in DNS to obtain ENS information (e.g., a blockchain address for "boo.art" in ENS). The third party 136 can directly probe ENS to resolve "boo.art" and read the extra information (e.g., name or organization). The third party 136 does not need to authenticate to access this information. Allowing the ".ART" DNS registry to have access control rights simplifies organization and synchronizing data in the ".ART" Top Level Domain in the blockchain system 502.

Data stored in the blockchain system 502 can be updated. For example, if any information changes in the Whois+Whatis database 101, this change can initiate blockchain transactions that updates corresponding information in ENS. For example, if owner of "boo.art" changes in DNS from "Jane Doe" to "Jack Doe", the registry 102 and/or the Whois+Whatis database 101 can initiate a blockchain transaction that updates the blockchain resolver 508 such that the "owner" (i.e., registrant) field stored by the blockchain resolver 508 is changed to "Jack Doe". Since this information is stored in the blockchain system 502, the change to "Jack Doe" can be viewed later on. That is, change in ownership of an object can be probed to find a history (i.e., provenance, chain of custody, and/or evidence of authenticity) for the object. A timestamp is used in organizing the blockchain. Since the blockchain is immutable, previous versions of information stored is accessible, thus, a change in ownership of an object can be recorded in the blockchain as a transaction which is visible to everyone with access to the blockchain. The transaction itself communicates provenance and/or chain of custody. By having the information stored in the blockchain such that any changes made are visible, the transaction can serve as evidence of authenticity. As such, changes to information stored in the blockchain (e.g., an owner of the DNS domain or the Art Record) is visible such that previous information associated with an owner of the DNS domain or the Art Record identifying a person or object is accessible.

Figure 7:
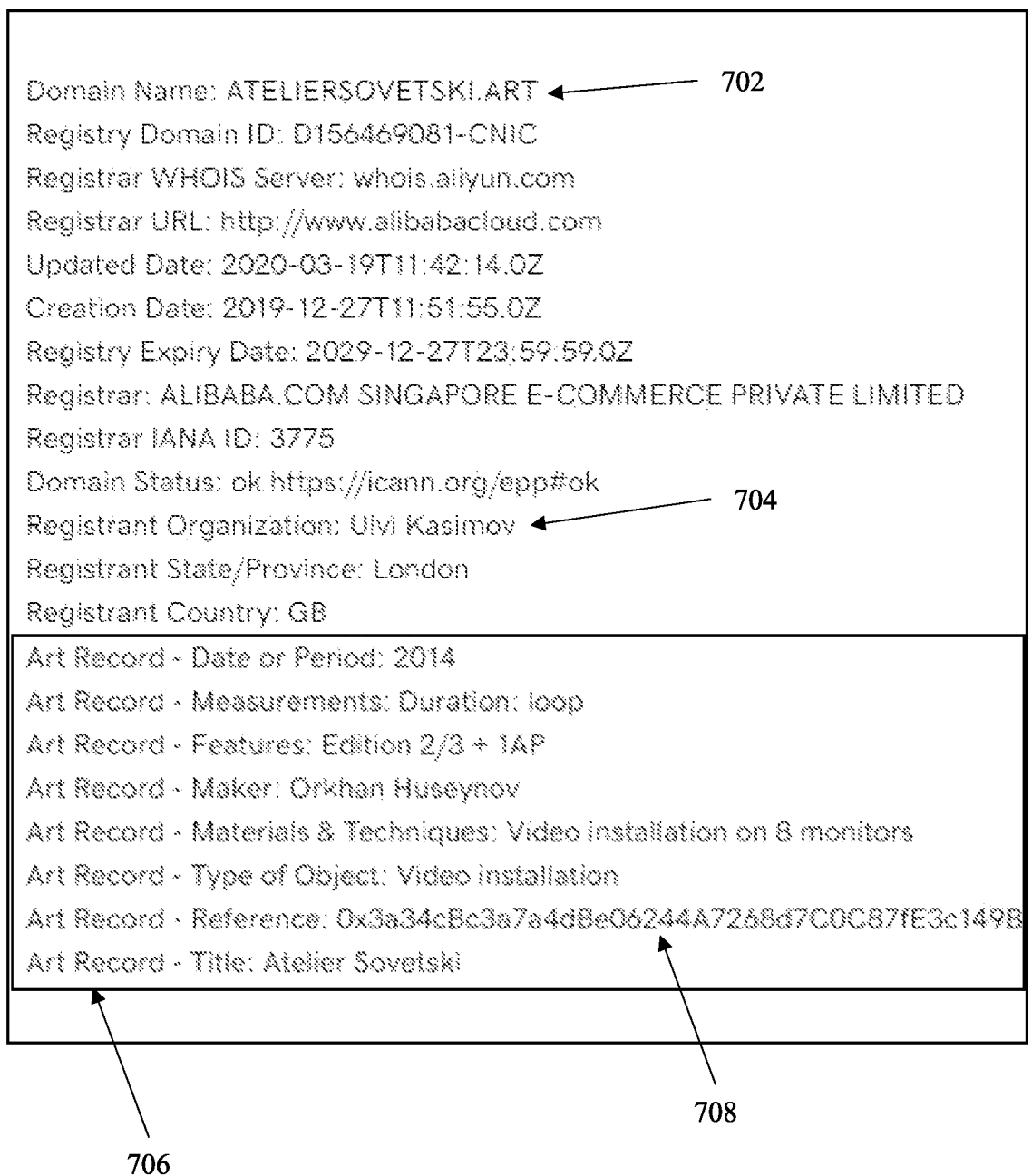
FIG. 7 illustrates an example Whois query, according to some implementations of the present disclosure.

FIG. 7 illustrates an example of results 700 after running a Whois query on the domain ateliersovetski.art. The Whois query can be run by the third party 136 (FIG. 5). The DNS domain name 702 is displayed as one of the "Whois" fields populated. The registrant organization 704 (i.e., owner of the DNS domain) is shown as "Ulvi Kasimov". The Whois query results 700 also include Whatis information designated as Art Record 706. In some implementations, the Art Record 706 includes a blockchain address 708. In some implementations, the blockchain address 708 is an address of the blockchain resolver 508. For example, the blockchain address 708 is an address of a resolver in ENS where duplicate information of the Art Record can be found. In ENS, an example of information that can be stored at the blockchain address 708 can include {"title":"Atelier Sovetski", "maker":"Orkhan Huseynov", "type":"Video installation", "subject":" ", "period":"2014", "dimensions": "Duration: loop", "materials":"Video installation on 8 monitors", "markings":" ", "features":"Edition 2/3+1AP", "reference":" ", "registrant name":"Ulvi Kasimov", "registrant organization":" "}. In this example, ateliersovetski.art hosts a website that shows a video that loops. Information related to this video is stored as the Art Record in DNS and duplicated in ENS.

Embodiments of the present disclosure include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the techniques introduced here may be provided as a computer program product, which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, random access memories (RAMs), erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting the scope of the disclosure, which is defined by the claims.

What is claimed is:

1. A method for providing and managing a Top-Level Domain for identifying an object, comprising:
   receiving a domain name associated with the object, the object being associated with an owner and object metadata regarding the object;
   generating a "Whois" record associated with the received domain name, the "Whois" record including a plurality of fields associated with the domain name, the plurality of fields consisting of registration data required for creating the domain name;
   expanding the "Whois" record by adding one or more new fields associated with the object to the "Whois" record, thereby linking the domain name with the object, wherein the one or more new fields comprises the object metadata; and
   generating a blockchain record on a blockchain system using the domain name linked with the object, wherein the blockchain record includes information associated with the object, wherein the information associated with the object includes at least i) owner information indicative of the owner of the object; and ii) domain name information indicative of the domain name linked with the object.

2. The method of claim 1, wherein at least one of the plurality of fields and the one or more new fields includes an ownership field for identifying the owner associated with the object.

3. The method of claim 1, wherein generating the blockchain record further comprises using the object metadata, and wherein the information associated with the object further includes the object metadata.

4. The method of claim 1, further comprising expanding the "Whois" record by adding a blockchain field indicative of an address of the generated blockchain record.

5. The method of claim 1, further comprising:
   receiving new owner information, wherein the new owner information is indicative of a change of ownership of the object from the owner to a new owner; and
   initiating a blockchain transaction to update the owner information of the blockchain record to indicate the new owner.

6. The method of claim 5, further comprising updating the "Whois" record based on the new owner information.

7. The method of claim 6, wherein initiating the blockchain transaction to update the owner information occurs in response to updating the "Whois" record based on the new owner information.

8. The method of claim 1, wherein transactions that change owner information are recorded in the blockchain system, the transactions serving as a chain of custody or an evidence of authenticity of the object or the domain name.

9. The method of claim 1, wherein the one or more new fields of the "Whois" record comprises an artist name, an artwork title, a creation date, a medium, and artwork dimensions.

10. The method of claim 1, wherein the object is viewable on a website associated with the domain name.

11. A system for providing and managing a Top-Level Domain for identifying an object, comprising:
    one or more data processors; and
    a non-transitory machine-readable storage medium containing instructions which, when executed on the one or more data processors, cause the one or more data processors to perform operations including:
       receiving a domain name associated with the object, the object being associated with an owner and object metadata regarding the object;
       generating a "Whois" record associated with the received domain name, the "Whois" record including a plurality of fields associated with the domain name, the plurality of fields consisting of registration data required for creating the domain name;
       expanding the "Whois" record by adding one or more new fields associated with the object to the "Whois" record, thereby linking the domain name with the object, wherein the one or more new fields comprises the object metadata; and
       generating a blockchain record on a blockchain system using the domain name linked with the object, wherein the blockchain record includes information associated with the object, wherein the information associated with the object includes at least i) owner information indicative of the owner of the object; and ii) domain name information indicative of the domain name linked with the object.

12. The system of claim 11, wherein at least one of the plurality of fields and the one or more new fields includes an ownership field for identifying the owner associated with the object.

13. The system of claim 11, wherein generating the blockchain record further comprises using the object metadata, and wherein the information associated with the object further includes the object metadata.

14. The system of claim 11, wherein the operations further comprise expanding the "Whois" record by adding a blockchain field indicative of an address of the generated blockchain record.

15. The system of claim 11, wherein the operations further comprise:
    receiving new owner information, wherein the new owner information is indicative of a change of ownership of the object from the owner to a new owner; and initiating a blockchain transaction to update the owner information of the blockchain record to indicate the new owner.

16. The system of claim 15, wherein the operations further comprise updating the "Whois" record based on the new owner information.

17. The system of claim 16, wherein initiating the blockchain transaction to update the owner information occurs in response to updating the "Whois" record based on the new owner information.

18. The system of claim 11, wherein transactions that change owner information are recorded in the blockchain system, the transactions serving as a chain of custody or an evidence of authenticity of the object or the domain name.

19. The system of claim 11, wherein the one or more new fields of the "Whois" record comprises an artist name, an artwork title, a creation date, a medium, and artwork dimensions.

20. The system of claim 11, wherein the object is viewable on a website associated with the domain name.

* * * * *